United States Patent
Foote et al.

(10) Patent No.: US 9,747,603 B2
(45) Date of Patent: Aug. 29, 2017

(54) SYSTEM AND METHOD FOR AVATAR TETHERING TO A USER ON A SOCIAL NETWORKING WEBSITE

(75) Inventors: Kevin Avon Foote, Tuscaloosa, AL (US); Robert Allen Carr, Tuscaloosa, AL (US)

(73) Assignee: FASTHEALTH CORPORATION, Tuscaloosa, AL (US)

(*) Notice: Subject to any disclaimer, the term of this patent is extended or adjusted under 35 U.S.C. 154(b) by 1920 days.

(21) Appl. No.: 12/622,133

(22) Filed: Nov. 19, 2009

(65) Prior Publication Data
US 2014/0052538 A1   Feb. 20, 2014

(51) Int. Cl.
G06Q 99/00 (2006.01)
G06Q 30/02 (2012.01)
G06Q 50/00 (2012.01)

(52) U.S. Cl.
CPC ............. G06Q 30/02 (2013.01); G06Q 50/01 (2013.01)

(58) Field of Classification Search
CPC ................................ G06Q 50/01; G06Q 30/02
USPC ....................................................... 705/14.66
See application file for complete search history.

(56) References Cited

U.S. PATENT DOCUMENTS

| | | | |
|---|---|---|---|
| 2008/0147501 A1* | 6/2008 | Gilliam | 705/14 |
| 2009/0276459 A1* | 11/2009 | Trout et al. | 707/104.1 |
| 2010/0064007 A1* | 3/2010 | Randall | 709/204 |
| 2010/0332330 A1* | 12/2010 | Goel et al. | 705/14.66 |

OTHER PUBLICATIONS

Chat taking off in corporations developers find market ready and waiting. (1997). Internet Week, 3(17), N/A. Retrieved from https://dialog.proquest.com/professional/professional/docview/678103464?accountid=142257.*

* cited by examiner

Primary Examiner — Jonathan Ouellette
Assistant Examiner — Maame Ofori-Awuah
(74) Attorney, Agent, or Firm — The Gache Law Firm, P.C.; Russell C. Gache

(57) ABSTRACT

A system for tethering a plurality of avatars to a user on a social networking website having a first avatar association to the user accessing the social networking site which is held in a database, and a second avatar association to the same user. The first avatar association connects the user to an avatar image that the user wishes to project, and the second avatar association connects the user to a third party advertiser that has its own avatar. Optionally, the user has a third avatar association connecting the user to the avatar of the website sponsor. A webserver generates web pages for the social networking website in response to a remote PC's request and, relying upon the stated avatar associations, delivers a webpage having the two or three avatars adjacent to a one another and adjacent to a communicative activity of the first user on the social network website.

29 Claims, 9 Drawing Sheets

FIG. 5B

Sample Image Table 140

| id | user id | photo | photo album | category | primary_pic | timestamper | upload_ip |
|---|---|---|---|---|---|---|---|
| 1 | 0 | '1.jpg' | '' | ''profile' | 1 | 0000-00-00 00:00:00 | '68.159.249' |
| 3 | 10 | 'Photo_2_copy.jpg' | '' | 'profile' | 0 | 04/21/09 12:24 PM | '68.159.249' |
| 4 | 10 | 'Photo_2_copy.jpg' | '' | 'profile' | 0 | 04/21/09 12:25 PM | '68.159.249' |
| 5 | 10 | '5.jpg' | '' | 'profile' | 0 | 04/21/09 12:26 PM | '68.159.249' |
| 6 | 10 | '6.jpg' | '' | 'profile' | 0 | 04/21/09 12:34 PM | '68.159.249' |
| 7 | 10 | '7.jpg' | '' | 'profile' | 0 | 04/21/09 12:42 PM | '68.159.249' |
| 8 | 10 | '8.jpg' | '' | 'profile' | 0 | 04/21/09 12:43 PM | '68.159.249' |
| 9 | 24 | '9.jpg' | '' | 'profile' | 0 | 04/21/09 02:16 PM | '68.159.249' |
| 10 | 18 | '10.jpg' | '' | 'profile' | 1 | 04/21/09 03:34 PM | '68.159.249' |
| 11 | 10 | '11.jpg' | 'photo1' | 'photo album' | 0 | 04/21/09 04:39 PM | '' |
| 12 | 10 | '11.jpg' | 'Weird' | 'photo album' | 0 | 04/21/09 04:39 PM | '' |
| 13 | 10 | '11.jpg' | '' | 'photo album' | 0 | 04/21/09 04:41 PM | '' |
| 20 | 10 | '20' | '' | 'avatar' | 0 | 04/21/09 07:51 PM | '74.248.178' |
| 143 | 144 | 146 | 147 | 149 | 151 | 152 | 153 |

FIG. 5C

Sample Message Board Table
156 →

| id | sender ID | Sender_Client ID | receiver ID | private | delete_by_sender | delete_by_receiver | message | message read | timestamper | reply_parent | message_type | alternate ID |
|---|---|---|---|---|---|---|---|---|---|---|---|---|
| 40 | 5 | 754 | 25 | 0 | 1 | 0 | 'Here's my message to...' | 0 | '2009-04-22 15:27:14' | 0 | 'bulletin' | 0 |
| 1 | 7 | 754 | 10 | 0 | 0 | 0 | 'This is a public message' | 0 | '2009-04-20 12:00:01' | 0 | 'bulletin' | 0 |
| 3 | 10 | 765 | 7 | 0 | 0 | 0 | 'Testing this functionality' | 0 | '2009-04-20 14:50:29' | 0 | 'bulletin' | 0 |
| 4 | 14 | 755 | 10 | 0 | 0 | 0 | '"This is a message to...' | 0 | '2009-04-20 15:19:17' | 0 | 'bulletin' | 0 |
| 11 | 17 | 754 | 17 | 0 | 0 | 0 | 'Go OSU' | 0 | '2009-04-21 08:03:28' | 0 | 'bulletin' | 0 |
| 19 | 19 | 765 | 1 | 0 | 0 | 0 | 'I would like to know...' | 0 | '2009-04-21 15:52:18' | 0 | 'bulletin' | 0 |
| 31 | 24 | 765 | 10 | 0 | 0 | 0 | 'This is Michael with my ...' | 0 | '2009-04-22 10:42:08' | 0 | 'bulletin' | 0 |
| 36 | 25 | 765 | 10 | 0 | 0 | 0 | 'I am finally here' | 0 | '2009-04-22 13:37:49' | 0 | 'bulletin' | 0 |
| 99 | 26 | 765 | 26 | 0 | 1 | 0 | 'Hey Chris' | 0 | '2009-05-15 09:26:20' | 0 | 'bulletin' | 0 |
| 69 | 27 | 765 | 26 | 0 | 0 | 0 | 'Hey Chris. Great game...' | 0 | '2009-04-30 09:24:37' | 0 | 'bulletin' | 0 |
| 70 | 28 | 765 | 26 | 0 | 0 | 0 | 'Have you talked to...' | 0 | '2009-04-30 09:26:01' | 0 | 'bulletin' | 0 |
| 71 | 29 | 765 | 26 | 0 | 0 | 0 | '"It was good to see you...' | 0 | '2009-04-30 09:28:01' | 0 | 'bulletin' | 0 |
| 75 | 31 | 765 | 31 | 0 | 1 | 0 | 'lkhjlkjlk' | 0 | '2009-05-04 13:06:03' | 0 | 'bulletin' | 0 |
| 80 | 32 | 765 | 31 | 0 | 0 | 0 | 'Don't forget we are...' | 0 | '2009-05-14 13:32:27' | 0 | 'bulletin' | 0 |
| 86 | 37 | 765 | 18 | 0 | 0 | 0 | 'I'll be leaving...' | 0 | '2009-05-14 13:37:01' | 0 | 'bulletin' | 0 |
| 89 | 40 | 765 | 18 | 0 | 0 | 0 | 'I just got back from...' | 0 | '2009-05-14 13:41:43' | 0 | 'bulletin' | 0 |
| 87 | 46 | 765 | 18 | 0 | 0 | 0 | 'Don't forget about...' | 0 | '2009-05-14 13:39:07' | 0 | 'bulletin' | 0 |
| 79 | 58 | 765 | 31 | 0 | 0 | 0 | 'Thanks for your help...' | 0 | '2009-05-14 13:31:12' | 0 | 'bulletin' | 0 |
| 157 | 158 | 159 | 161 | 162 | 164 | 166 | 167 | 169 | 171 | 172 | 173 | 176 |

SYSTEM AND METHOD FOR AVATAR TETHERING TO A USER ON A SOCIAL NETWORKING WEBSITE

FIELD OF THE INVENTION

The present invention relates generally to social networking websites and website advertising. In particular, the present invention relates to the targeting of advertising for users of social networking websites. In even greater particularity the present invention relates to techniques for assigning logos and identifiers with users utilizing a social networking site.

BACKGROUND OF THE INVENTION

Social networking websites on the internet have proliferated greatly from approximately 2002 until 2009. The goal of any social networking site is to facilitate the social networking of human beings by actively identifying and connecting those users together through a commonality of experiences and interests. Friends, acquaintances, co-workers, and family members who utilize a social networking website experience increased social interaction through the features and services offered on a particular social networking website. Such services include, message boards, moderated forums, picture and photo boards, the interactive commenting of topics posted to such message boards and forums, publication of select biographic information, finding of potential friends, chatting, and e-mail notifications of posted communications. In the background of these typical services, sophisticated computer algorithms constantly check for potential intersections of interests and desires, and notify users of such intersections when advantageous to increase social interaction.

From offering superior features utilized in such services, a select few social networking websites have attracted the majority of the internet users who frequent social networking sites. Specifically, as of this filing, Myspace™, Linkedin®, and Facebook have attracted the majority of social networking users. The users utilizing these vendors number in the tens of millions.

Social networking sites generate revenue from targeted advertising. Utilizing an array of biographical profile information that is captured for each social networking user, advertisers are able to present products and services to users that are relevant to each user's needs and desires. Each user typically provides a wealth of biographical information to a social networking site with which they register, and such information is constantly updated and incremented with additional visits to the site. Advertisers can then leverage from that information and tailor the content of their advertising to best fit each user. Advertisers are eager to advertise on social networking sites so that they may realize a more efficient return on their advertising investment. Therefore, the unique environment of a social networking site allows advertisers to precisely target potential consumers based upon the commonality of needs of a site's participants.

Users of social networking sites typically upon signing up for a social networking website service provide a photo or other usual indicia representing their persona. In many instances, a person will not utilize a true visual representation of their likeness, but will instead select a predefined "avatar" that may be supplied by the social networking site. In some instances, a user can supply their own avatar by uploading it. An avatar is a graphical image that represents a user on a social networking site which typically projects a desired characteristic of that individual, depending upon the projection wishes of the user. Such an avatar may be a static image, or an animated image. Avatars typically will be presented adjacent to postings and other types of communications deposited on a social networking site by the user, such as for example a message board. This avatar association provides a mechanism for viewers to quickly identify the source of a particular posted communication, and/or make replies thereto.

However, while the targeting of users traversing social networking sites with advertisements has become commonplace, the association of a particular user's avatar with indicia of a particular goods manufacturer or service provider has not yet occurred. The ability to cross link or "tether" an indicia of a company with a social networking site user could result in an additional proliferation of recognition of that company's indicia, such as the company's trademarks or service marks, through additional presentation "impressions." Such tethering has the potential to rapidly create additional goodwill for the manufacturer or service provider seeking to expand their company's recognition within the genre of users frequenting social networking sites.

Therefore, what is needed is a system and method for associating a selected indicia of a company with the avatar of a social networking site user such that a linking or tethering of the two can be achieved across one or more social network sites.

SUMMARY OF THE INVENTION

A system for tethering a plurality of avatars to a user on a social networking website having a first avatar association to the user accessing the social networking site which is held in a database, and a second avatar association to the same user. The first avatar association connects the user to an avatar image that the user wishes to project, and the second avatar association connects the user to a third party advertiser that has its own avatar. Optionally, the user has a third avatar association connecting the user to the avatar of the website sponsor, such as a university or college sponsoring the website, or other institution. A webserver generates web pages for the social networking website in response to a remote PC's request and, relying upon the stated avatar associations, delivers a webpage having the two or three avatars adjacent to a one another and adjacent to a communicative activity of the first user on the social network website. Additional associations with additional users allow the display of additional avatars with the additional users on the generated website. Various computer system topologies are presented to optimize the sharing of the aforementioned associations amongst a plurality of connected social networking sites.

BRIEF DESCRIPTION OF THE DRAWINGS

A system and method for the tethering of user avatars and advertising avatars incorporating the features of the apparatus and method are depicted in the attached drawings which form a portion of the disclosure and wherein:

FIG. 5B shows a preferred database structure associated with an image recordation table holding the avatar images;

FIG. 5C shows a preferred database structure associated with a message board table utilized in the invention;

PREFERRED EMBODIMENTS

Figure 1:
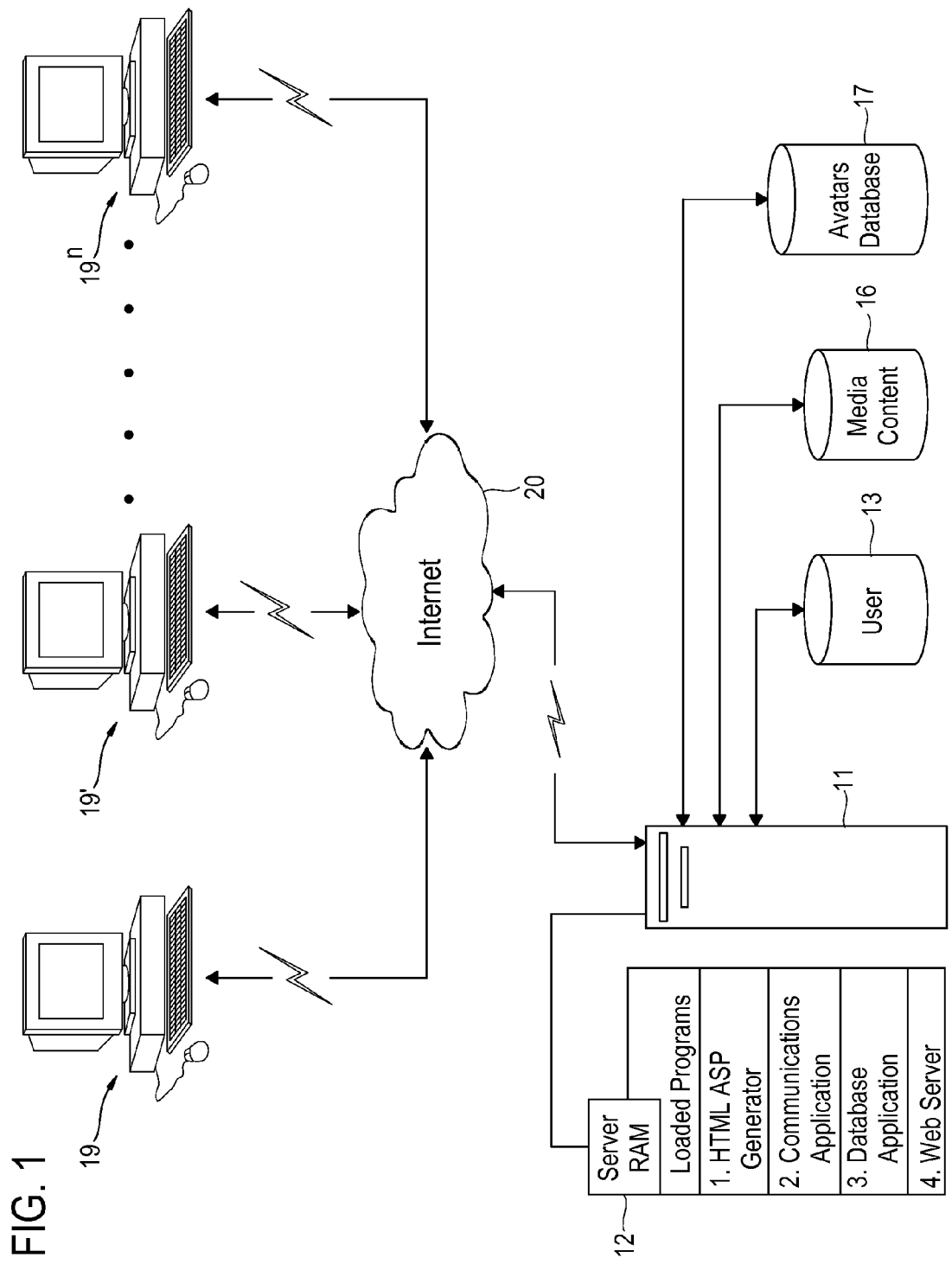
FIG. 1 is a computer system within which the system can operate.

Referring to the drawings for a better understanding of the function and structure of the invention, FIG. 1 shows a system topology of a system 10 having a computer server 11, various loaded programs in its ram 12, and several connected databases (13, 16, 17). Programs loaded in ram might include an Active Server Pages ("ASP" or "ASP.net") webpage creation program (available from Microsoft Corporation) to create webpages on the fly upon request from a remote user. The ASP program would work in conjunction with a webserver program to handle remote webpage and resources requests from remote computers 19-19$''$. A database edit, access, and storage program and a communications program for communicating with other servers and remote computers 19-19$''$ via the Internet 20 are also included. Further discussion regarding the generation of webpages in an ASP.net environment and the transmission and delivery of such webpages to a remote requesting PC over the Internet are omitted in as much as such processes are well understood in the industry and not essential to a complete understanding of the herein described system. Also, as will be understood, remote computers 19-19$''$ may include of any type of personal computing device capable of accessing and interacting with a social networking site, such as for example PDAs, smart mobile phones, laptop computers, interactive televisions, or network connected multimedia viewers, etc.

Database 13 includes user information for recording a user's profile and other related information, such as login IDs and passwords to a social networking website. Database 16 includes content to be served to remote requesting client computers 19-19$''$, including audio visual data, images, and other content that might be streamed to the remote PC clients. A third database 17 includes advertising to be served to viewers on remote computers 19-19$''$ and includes avatars to be integrated into served webpages in accordance with the herein described system. For the purposes of this disclosure, an avatar is defined as a relatively small graphical image that represents a trademark, photo, graphical image or other pre-selected visual indicia associated with a user on a social networking site, including an indicia of an associated third party, that has made a communicative interaction with the site, such as a posting on a bulletin board screen or an uploaded video.

Figure 2:
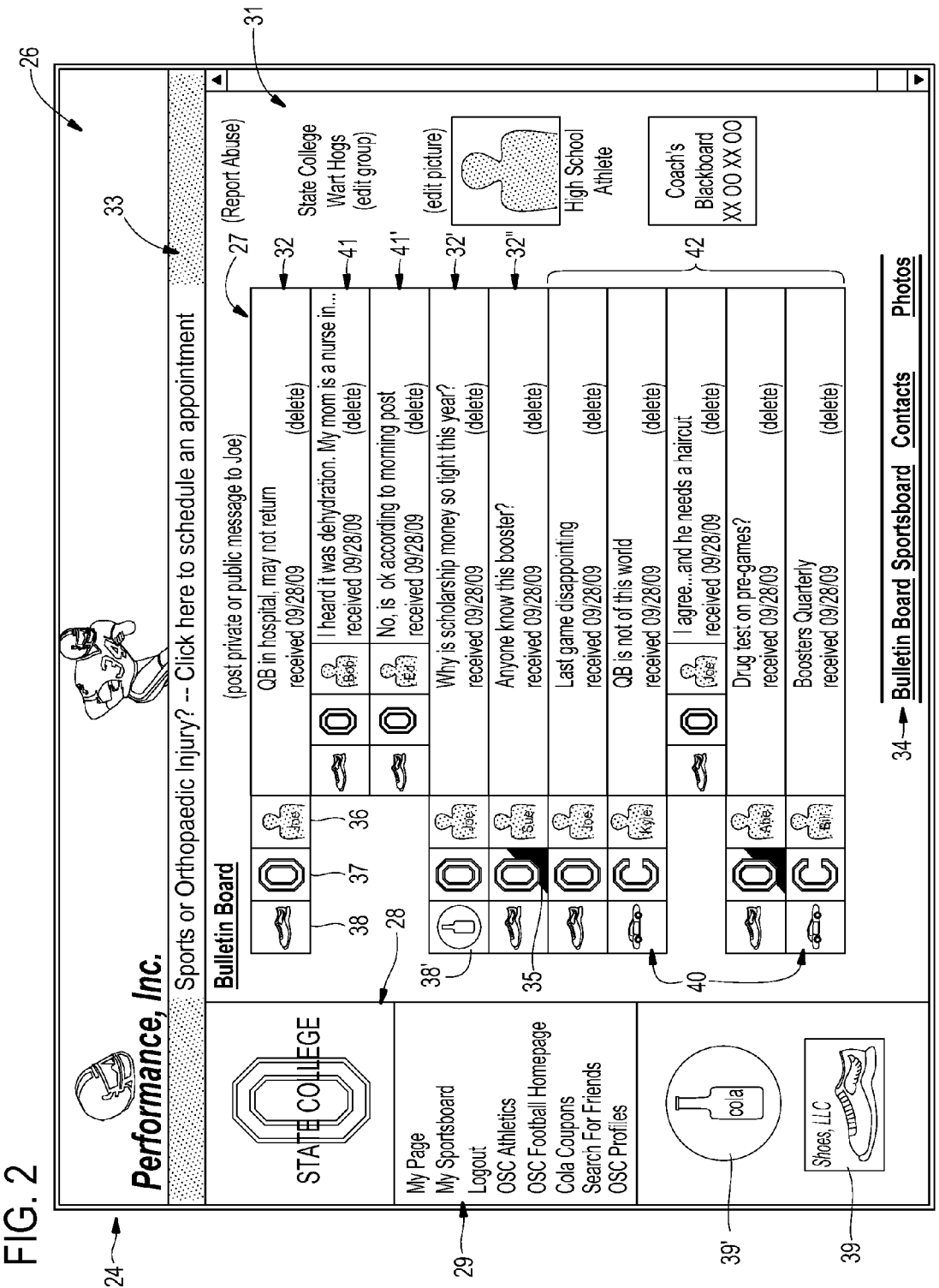
FIG. 2 is a social networking message board webpage showing the avatar elements generated by the disclosed system.

Referring now to FIG. 2, the herein described system may be implemented on a single social network website webpage a having various elements. The webpage 26, includes theme wrapping from the primary sponsor of the page 26 and a header frame 24 at the top, a navigation side panel frame 29, a sponsorship advertising frame 31, ancillary bottom navigation tabs 34, a banner advertisement 33, and a message or "bulletin" board 27 displaying various postings. The bulletin board topic postings include the nominal threaded display formatting 32-32", with hierarchical response threads 41-41'. Numerous postings may be seen at 42, and a large site sponsor rectangular banner also appears at 28.

The bulletin board postings 32-32' each display avatars directly to the left of each posting as shown at 36-38. The avatars consist of a user avatar 36, a primary site sponsor avatar 37, in this case a college or university, and a promotion avatar 38 associated with a sponsoring advertiser. The user avatar 36 consists of a graphical image uploaded or selected from a group of presented avatars via the website. The primary website sponsor avatar is a graphical image pre-selected by the sponsor that is connected to the user during the registration procedure from which the user obtained their unique login and password identifiers.

As may be seen in the figure, the user avatar 36 may change depending upon who is posting a message on the bulletin board. The site sponsor avatar 37 may also change depending upon the avatar assigned to the user during registration in response to the site sponsor on which the user registered. This is because each website will likely have a different site sponsor. Also, depending upon a particular category to which the user is associated during registration, the site sponsor avatar may change slightly from a primary avatar. For example, a student signing up for the service may be assigned a slightly different avatar than an alumnus, a varsity player, or a coach. However, it is expected that the site sponsor avatar would create a recognizable, consistent overall impression, irrespective of the class variance within the avatar such that the user remains connected to the site sponsor while varying minor graphical avatar elements to convey a special category assignment. An example of such a modified site sponsor avatar may be seen at 35.

Turning now to the sponsor advertisement avatar 38, it may be seen that this avatar varies per posting depending upon which sponsor avatar is to be displayed, even with an identical repeated user posting. A variety of methods are known for selecting a sponsor advertisement and displaying it on a website, and each of those methods are acceptable for selecting an avatar for a particular sponsor to be displayed. For example, a pool of advertiser avatars may be assigned different weightings and retrieved on a rotating, but weight favored process, as is known for retrieving banner advertisements to a website on a rotating basis.

As may be understood, an avatar would most likely display a graphical image that is already known by the general consuming public. Avatars serve a different function than advertising. While an advertisement may convey some desirable characteristic of a product or service offered by a particular entity, an avatar principally serves to evoke a recognitive effect in a consumer who has already been exposed to indicia associated with the goods or services offered by the advertising sponsor. For example, the display of a Nike™ swoosh trademark would evoke a prior established recognition and goodwill associated with Nike™ brand products, namely various types of athletic footwear. Similarly, an avatar displaying a Coca-Cola trademark, would evoke in a consumer a generalized recognition of Coca-Cola brand products such as carbonated beverages, fruit juice beverages, and bottled water. Hence, the display of a third party avatar serves a different function from a usual Internet based banner or sponsor panel advertisement. The avatar primarily evokes prior established memories in a consumer.

Applicant notes that each avatar may include inherent functionality. For example, a viewer of the webpage may "mouse over" the avatars and evoke a response such as offering to transfer the viewer to a site associated with the displayed advertiser, or depending upon what type of goods or services the avatar represents may offer to display an alternative page displaying similar service or product offerings. In addition, each avatar may be selectable to transfer the viewer to another page associated with the avatar sponsor or a service ancillary to a user avatar, such as a type of personal search service.

Also, as may be seen, the positioning of an avatar is critical to an avatar's purpose. An avatar must be associated with a particular communication object, such as a user's avatar and/or a bulletin board posting, in order to properly achieve the avatar invocative purpose. When an advertising avatar is positioned adjacent to a user's avatar or a posting, the advertising sponsor is connecting its products or services, in a generalized manner, to that user and their posting. Positioning an avatar randomly on a webpage significantly dilutes its targeted effect, and would like cause confusion to a consumer encountering the unconnected avatar. Therefore, specific rules for placing avatars retrieved from database 17 should guide the website generating process so that correct avatar grouping and alignment is achieved.

Avatars may change in accordance with changes in advertising sponsor selection as discussed above or, alternatively, as may be varied if the sponsor is being drawn from other websites that will have their own advertising sponsors associated with that site's users, as indicated at postings 40. In the example of 40, another site has entered into an interoperability agreement with the present site to exchange avatar images along with their user associations. A user from that other site has visited the present site as a guest user, and as the guest user makes posts to the bulletin board, the avatars associated with the guest user's original registration site are drawn alongside the post made by the guest user. As shown, a site sponsor having a "C" as its avatar is displayed, and an advertisement sponsor from that site, in this case an automobile vendor, is displayed. The guest users making posts, in this example Kyle and Bill, will have their own avatars displayed as recorded from their original registration website. The mechanism used to the exchange of the avatars is discussed in more detail below and in accordance with the computer topology shown in FIGS. 6 and 7.

Figure 3:
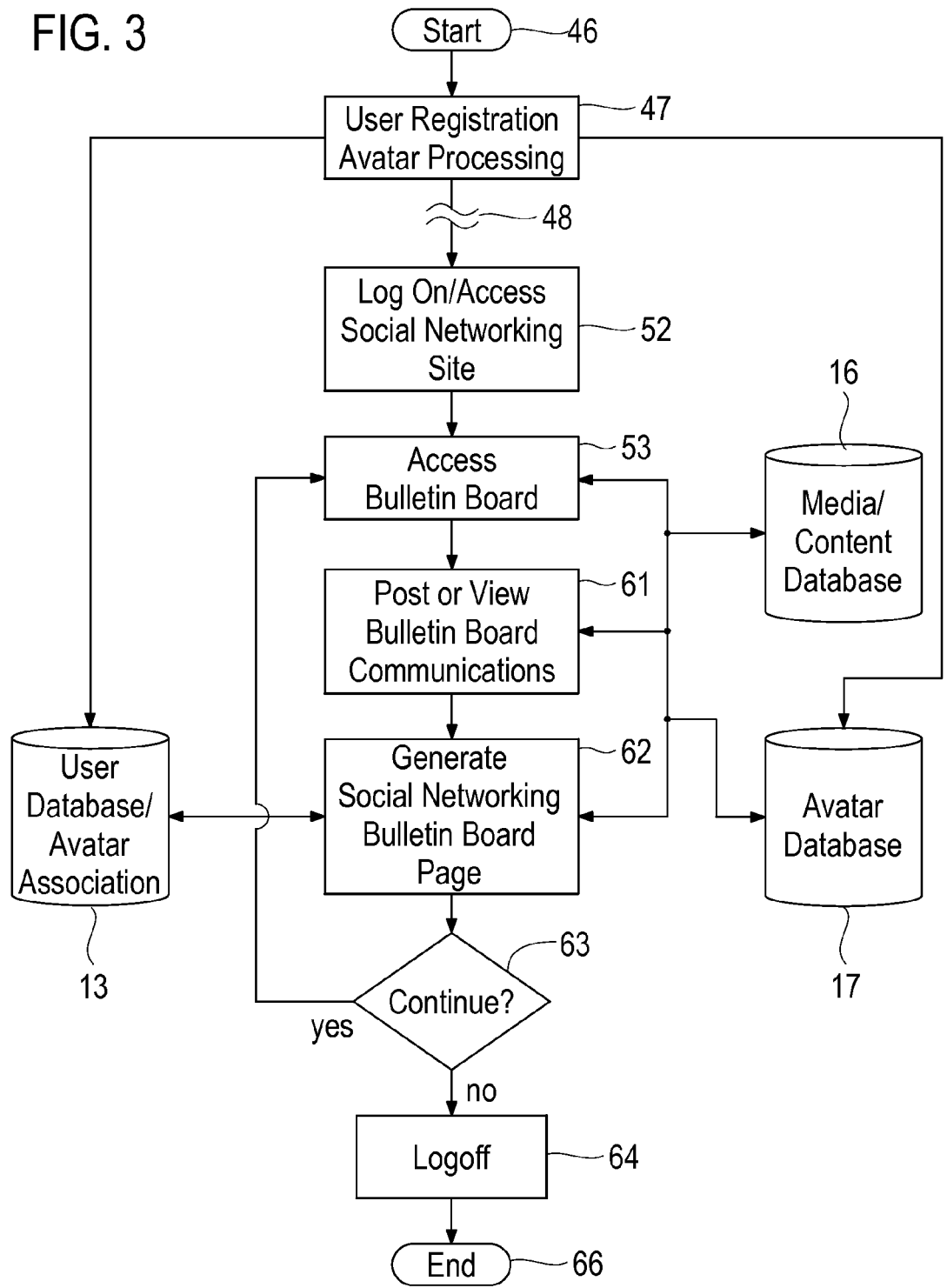
FIG. 3 is a process flow diagram showing the primary steps associated with the assignment of an avatar and the generating of a webpage utilizing the described system.

FIG. 3 shows the flow of the overall process of the system 10. Initially, a user registers with the social networking site 47 to record in database 13 biographical information entered in predefined fields presented to a user during the registration process, such as age, preferred login information, contact information, identifying name or moniker, and an avatar image. An avatar image is often presented to the user from an available collection of avatar images already saved in the image database, or the user may upload a preferred image meeting certain suitable format and size constraints via their own PC. Once an avatar is selected or uploaded and saved in database 17, that avatar remains associated with or "tethered" to the user, as recorded in user database 13. In addition, as will be further discussed, an avatar for the social networking website sponsor may also be associated with or tethered to the user, as well as other avatars.

After registration 47, a user may logon to the social networking site 52 at a time of choosing and access any number of social networking services, including accessing a bulletin board page 53. Accessing the bulletin board page causes the system to access and retrieve media and other posted content from database 16, as well as any avatars in database 17 tethered to the user accessing the page, as well as retrieving avatars tethered to any other user having a posting on the bulletin board page. The requested bulletin board page is then generated 62 with further input from user database 13 and delivered to the remote requesting PC 19. The user can then continue navigation, viewing postings and making postings as desired 63, or navigate away from the bulletin board or away from the social networking site. Logoff 64 occurs either via navigating away from the social networking site or selecting a manual logoff button on the site itself, as is known. The process then ends 66 at that occurrence.

All pages are generated in HTML version 5.0 via PHP commands, but ASP may be used as an intermediary HTML page command generator if preferred. As is known in the industry, bulletin board entries are retrieved via active database query entries and postings generated for each webpage delivered to a requesting remote PC in a predefined user sorting scheme, depending upon the requestor web browser selections.

Figure 4:
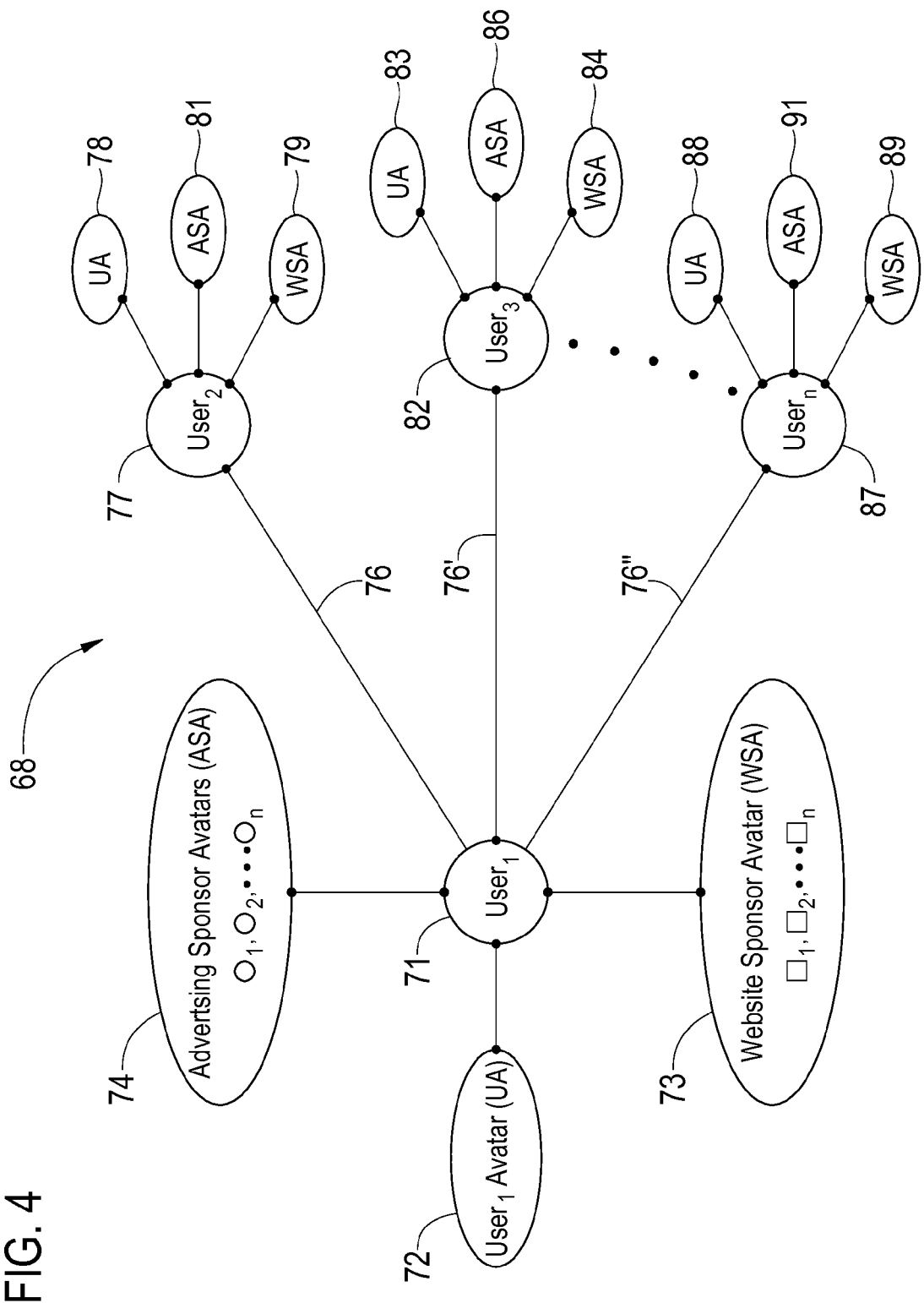
FIG. 4 is an object association diagram showing the interaction between avatars a user and other users.

Referring now to FIG. 4, one may view the tethering dynamics 68 between different users and their avatars, as well as the avatars of advertising sponsors and site sponsors displayed on a generated website. User 1 (71) is connected with their own avatar 72 which is displayed in association with a user id or selected moniker name. A website sponsor avatar 73 is assigned to User 1 and remains connected to User 1 as User 1 travels through a social networking site. As indicated, a plethora of avatars may exist to elicit recognition of the website sponsor and to differentiate a class to which User 1 belongs, as typically established during the registration process. Similarly, a group of avatars for advertising sponsors 74 are connected to User 1 and displayed along with website sponsor avatars 73 with User 1 in accordance with predefined advertising server protocols. For example, a subset of the total advertising sponsors, such as for example footwear advertisers, may be associated with User 1 and displayed at random along with User 1's user avatar, depending upon User 1's biographical information recorded during the registration process.

User 1 is also connected to other users 76-76". For example, User 2 (77) may logon and navigate to a message board page for the social networking website. There, it may post or view messages from User 1 and at that instance encounter the avatars associated with User 1 (72) as described above. Similarly, in posting a reply, User 1 would encounter the avatars for User 2, such as User 2's avatar 78, the website sponsor avatar associated with User 2 (79), possible indicating a class of registration, and a third avatar 81 of an advertising sponsor avatar. A third User 82, has similar associations as does User 2 (77), and these can be extended indefinitely in like schema to additional users 87, each have avatar tether associations. Therefore, as may be seen, all users registered on the social networking site are connected and have avatar associations that are shared within any webpage intersecting such users. With interoperability agreements among different social networking sites, users on one social networking site can be further connected to users on a different social networking site. Such aggregation can result in large proliferations over every increasing geographical areas for site and advertising sponsors to display their avatars.

Tables 1.0-4.0 below provide pseudo-code renderings of several processes used to generate a webpage on the social networking site, including generating and showing ads, posting user content, retrieving tethered avatars, etc. All of the processes may be implemented in "PHP: Hypertext Preprocessor" ("PHP"), or similar scripting language. These processes focus on a bulletin board page model for a social networking site, but these processes can be generalized to apply to any webpage generated from a social networking site in accordance with the goals of the herein described system 10. The message board page (sometimes referred to as a "bulletin board" in the industry), would typically include standard discussion board processing capabilities, such as photo comments, group distribution list discussions, wall postings, public versus private postings, etc. Tables suitable for use in the below described processes, may be found in FIGS. 5A-5C.

TABLE 1.0

Pseudo-Code for Advertisement Retrieval Process.

```
Client log in → retrieve userID and clientID (sponsor ID)
Gather page objects:
    Left Ad 1 → call GET AD(type=leftad1, clientID, 200x50)
    Left Ad 2 → call GET AD(type=leftad2, clientID, 200x50)
    Right Ad 1 → call GET AD(type=rightad1, clientID, 120x81)
    Page Content → fetched from DB or perhaps call to "Make
    Discussion Board"
    Paint Page (clientID) → create the user's page based on the
    sponsor identifier and page objects
```

TABLE 2.0

Pseudo-Code for PHP Program to Generate a Bulletin Board Page

```
Make Discussion Board BEGIN
    retrieve message board rows where userID=db.receiverID, deleted
    fields are 0
    FOR EACH message [if owner or not private]
        GET AD (type=38ad1,sender_clientID,38x38, [and/or other criteria])
        Assign Client Avatar (sender_clientID and page_type [and/or other
criteria])
        Assign User Avatar (userID)
        Display Message
        Generate All Replies
    END FOR EACH message
END Discussion Board
```

TABLE 3.0

Pseudo-Code for a "get add function" (local and remote)

```
LOCAL GET AD (ad type, ad owner, ad size, other criteria)
    retrieve AD from database matching type, owner, and size
    return ad object to caller. includes ad image, ad alt-text, ad URL
END
REMOTE GET AD (ad type, ad owner, ad size, other criteria)
    use local database, look up ad servers for [ad owner]
    query remote service to return LOCAL GET AD based on input criteria
    return ad object to caller. Includes ad image, ad alt-text, ad
    GLOBAL-URL
END
```

TABLE 4.0

Pseudo-Code for Retrieving a User Avatar

```
GET CLIENT AVATAR (clientID, other criteria)
    call GET AD (type=avatar, clientID, 38x38, incoming other criteria)
    NOTE: other criteria currently includes an optional entry for page_type
      to fetch alternate avatars
    return GET AD object
END
```

As one skilled in the art will note in Table 4.0, a user tethered avatar (i.e. a "client avatar") has been distilled down to a special type of ad retrieval function which has been labeled "GET AD" with a type designated as "avatar."

Figure 5A:
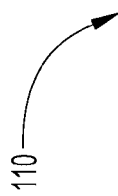
FIG. 5A shows a preferred database structure associated with a user's table in the invention.

In accordance with FIGS. 5A-5C, databases 13 ("User Database"), 17 ("Avatar Database"), and 16 ("Media/postings/content Database"), respectively, may have the sample structure shown in the figures and which are satisfactory to practice the herein described system 10 and associated method steps. The table listed in FIG. 5A has a sample structure 110 providing an example of multiple users saved in a satisfactory data identification format. Various types of biographic information (113-138) such as date of birth, gender, first and last name, education level, group association on the social networking website, and ID 111 (i.e. user identification no.). Database table 110 also includes a client ID 112 that represents assignment of a sponsor avatar image to the specified user. This avatar client ID no. associates a website sponsor avatar to the user. For example, user with id no. 6 has client ID 765 associated with them. When information from the system is supplied on user 6 to allow webpage generation for a message board, the avatar associated with client 765 would be retrieved and displayed adjacent to the avatar for user 6. By assigning unique IDs for each client (i.e. a website sponsor like State College—see FIG. 2), multiple avatars for one website sponsor may be assigned to a particular user, thereby allowing the assignment of different classes of avatars for each website sponsor to different users during the user registration process. The table shown in FIG. 5A preferably has table definitions shown in Table 5.0 below. Each table may be implemented in MySQL™ (My Structured Query Language), in an Oracle™ database language, or any other similarly capable database language, as selected by a designer.

TABLE 5.0

| | users | |
| --- | --- | --- |
| row name | row type | description |
| id | integer | user identifier |
| clientID | integer | current sponsor identifier |
| birthdate | date | |
| priv_birthdate | bool | |
| gender | M/F | |
| password | password | |
| first_name | text | |
| last_name | text | |
| email_address | text | |
| priv_email_address | bool | |
| deleted | bool | |
| date_joined | date | |
| grade_level | integer | |
| priv_grade_level | bool | |
| grad_year | integer | |
| priv_grad_year | bool | |
| page_type | keyword | |
| parents_names | text | for security, etc. |
| about_me | text | general information |
| ncaa_number | text | if applicable for sports usage |
| official_member | bool | official member of current sponsor |
| primary_group | keyword | not currently used |

Database 17 records avatar images and other content related to the social networking site. For example, database 17 may also include advertising images, video files, and photographs, each of which may be referenced and accessed during the generation of a message board webpage. As shown by example database 17 table 140 shown in FIG. 5B, a user id 144 is associated with each image file name 146, and may even include album 147 and category identifiers 149. The table shown in FIG. 5B preferably has table definitions shown in Table 6.0 below.

TABLE 6.0 user_photos

| row name | row type | description |
|---|---|---|
| id | integer | photo identifier |
| userID | integer | user identifier |
| photo | server location | photo name (for identification in server file system) |
| photo_album | keyword | keyword association for albums |
| category | keyword | profile, photo album, avatar, etc. |
| primary_pic | bool | used for profile and avatar pics to define current |
| timestamper | date/time | upload date and time |
| upload_ip | ip address | upload source |

Database 16 records posting in a message board and may have a structure similar to the example database table 156 shown in FIG. 5C. Each message is identified 157, along with the posting user's id 158, the associated sender client id 159 (i.e. the site sponsor's id), and the user id 161 for the user that posting the first or parent message to which other may have responded. Message content is recorded in cells 167, and may include reference links to other images, photos, and video content. The example table shown in FIG. 5C preferably has table definitions shown in Table 7.0 below.

TABLE 7.0 message_graffiti_wall

| row name | row type | description |
|---|---|---|
| id | integer | message identifier |
| senderID | integer | message owner id |
| sender_clientID | integer | message owner's sponsor id (at time of message) |
| receiverID | integer | message receiver id |
| private | bool | public/private message |
| delete_by_sender | bool | deletion flag |
| delete_by_receiver | bool | deletion flag |
| message | text | message content |
| message_read | bool | read/unread flag |
| timestamper | date/time | |
| reply_parent | integer | parent message identifier |
| message_type | keyword | message type: bulletin board, photo comment, etc |
| alternateID | integer | some other applications use this special identifer for lookups |

Figure 6:
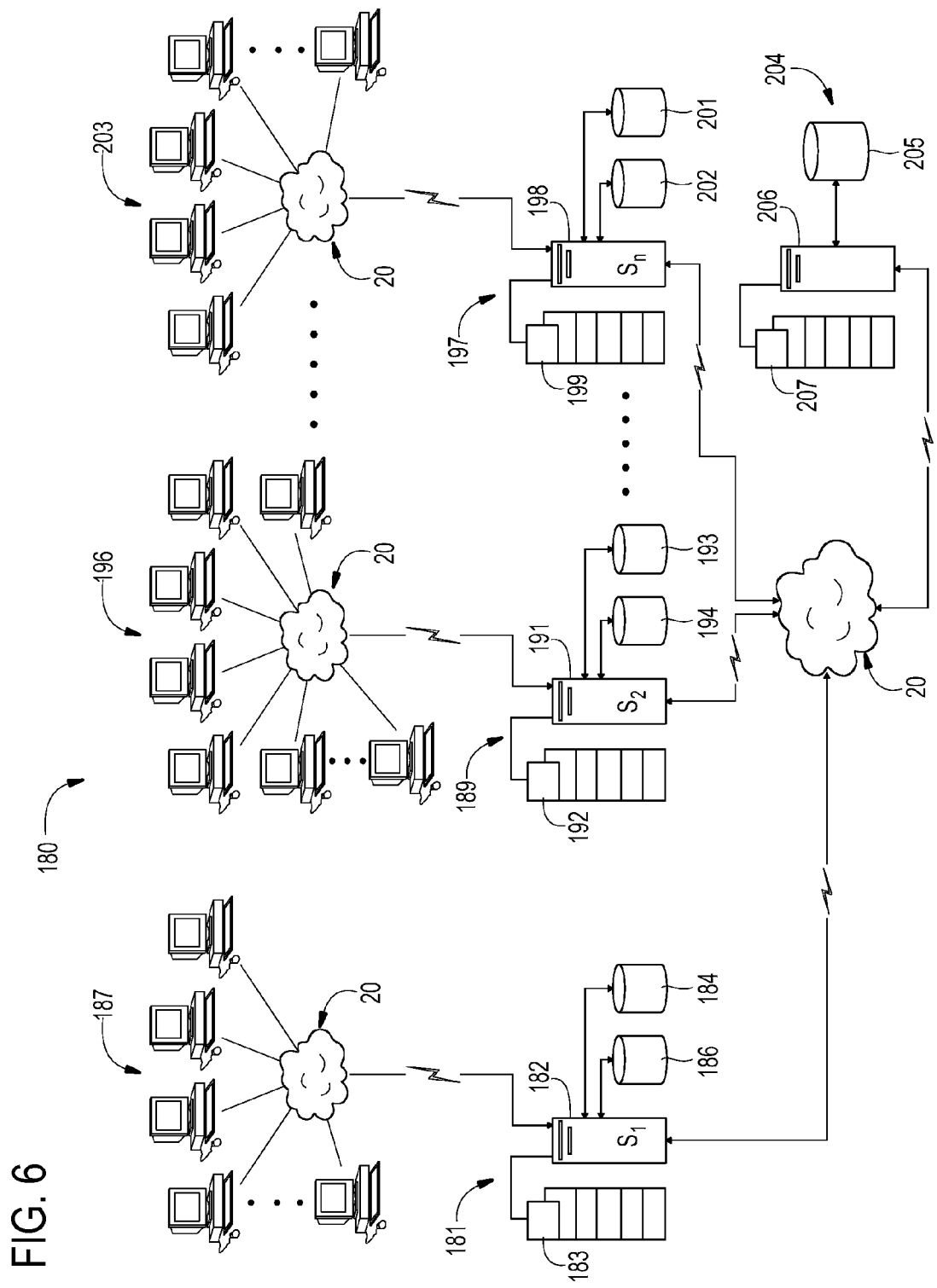
FIG. 6 shows a preferred distributed network embodiment of the current system having a centralized avatar database topology; and, FIG. 7 shows another embodiment of a distributed network embodiment of the current system having a replicated database topology.

Referring now to FIG. 6, it may be seen that the system 10 may be replicated into a plurality of connected, but different social networking sites, each connected into a centralized avatar database server system topology 180 as shown. Each server 182, 191, 198, is connected or accessed by its own set of registered users having their own remote client computers 187, 196, 203, via the Internet 20. A dedicated database server system 204 is connected to each social networking system 181, 189, 197, via the Internet 20 as well. Such a topology provides for all avatars, and other social media files, to be retained in database 205 on a centralized server system 204, and can provide advantages in speed for generating webpages by each accessing server 182, 191, 198, and may provide greater security and integrity in the avatar database 205. Moreover, a centralized avatar database accessible by such a plurality of social networking website systems 181, 189, 197, may facilitates the cross exchange and interoperability between different, but connected social networking website system 181, 189, 197. For example, should a user in group 187 access website system 189 as an unregistered visitor, server 191 will interrogate the remote computer in group 187 to determine via cookies deposited on the PC whether the visiting user is part of a recognized collective social networking system. Alternatively, remote user part of group 187 may use its login credentials for system 181 in system 189, and be provided some subset of access to system 189 as compared to system 181. In either instance, once remote user in group 187 is recognized, associated avatars tethered to the visiting user can be accessed in database 205 and displayed with any postings made by the visiting user pursuant to the process shown in FIG. 3. In addition, because avatars for sponsoring advertisers for system 181 and social networking site sponsors are saved in database 205, these avatars may also be retrieved with equal speed to any other avatar accessed by server 191 and displayed with any postings made by the visiting user. This type of accessibility is replicated for any connected collaborative social networking site 197, potentially connected a vast number of social networking sites while maintaining avatar tethering as discussed.

In the topology shown in FIG. 6, each user and content database remains locally connected to a webserver. For example, server 182 is connected to content database 184, and user database 186, preferably over a local high-speed data-bus or optical link. Each user registered on site 181 will have their content saved in these two local databases. Upon webserver 182 initiating the generation of a webpage, a request for appropriate avatars is made to system 204 and supplied via internet connection 20. However, over large geographical distances, it may be more advantageous to maintain a local database of avatars, yet maintain a scaled and distributed topology as shown in FIG. 7.

Figure 7:
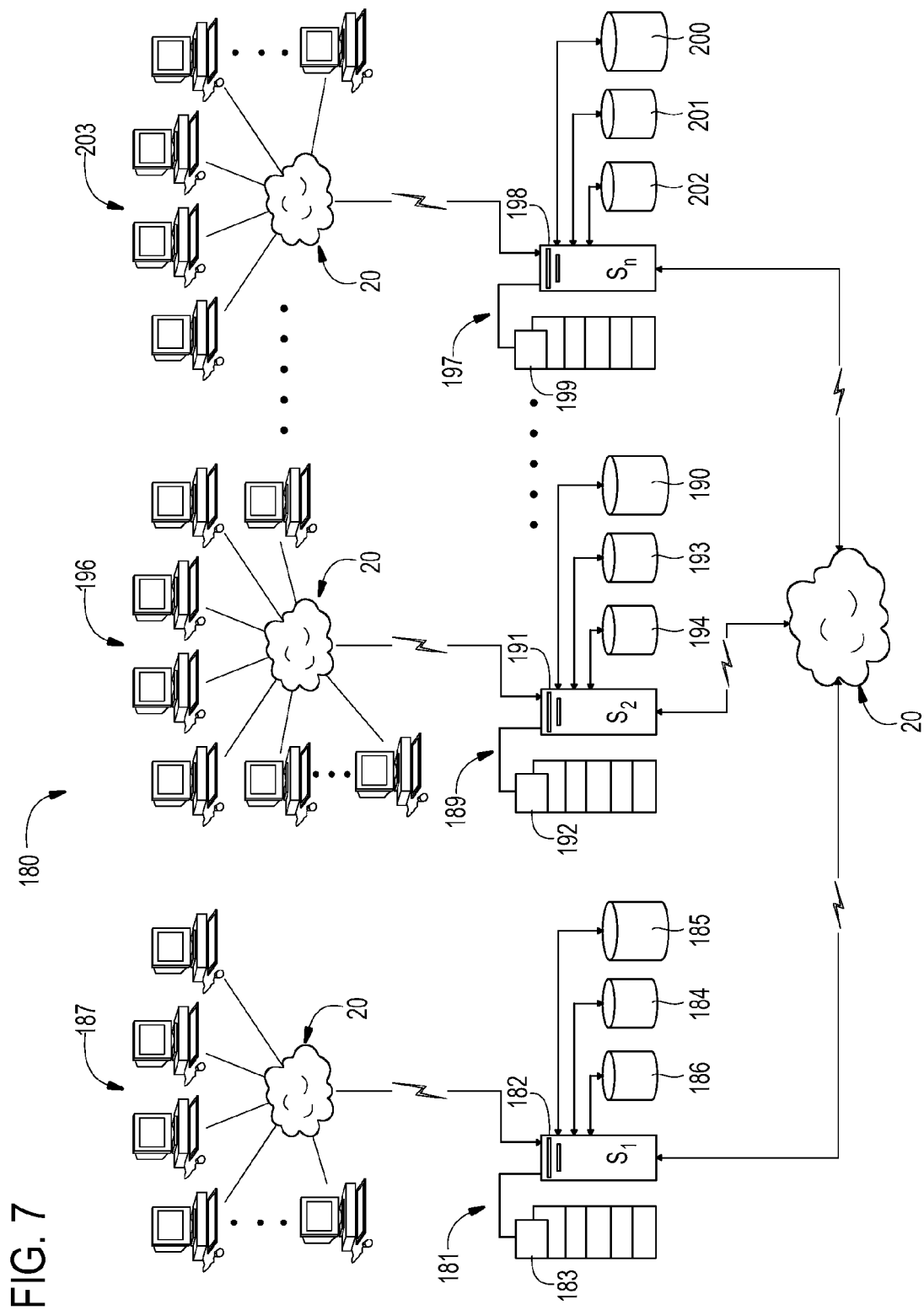

FIG. 7 shows a connection topology of servers 181, 189, and 198, in which each server maintains its own local avatar database (185, 190, 200). Each server is connected via the Internet 20 and continually checks for discrepancies between each avatar database and updates each respective database table to maintain identical tables, and in addition each server exchanges graphical files not present in each respective the local database. MySQL offers remote reconciliation functions and routines to reconciled remote replicated databases, as is known.

In either topology shown in FIGS. 6 and 7, the distribution of data can be optimized such that only files holding tables of indexing data may be exchanged and updated. For example, in FIG. 6 database 205 may only include a large database index file (i.e. a catalog) the keeps track of all avatars located in all servers (181, 189-197), and the association of each avatar with its user, advertising sponsor, etc. That index file is accessed frequently, yet remotely, by each server 181, 189-197 from which they may then request and obtain avatar images for a particular entity upon need. Hence, each server 181, 189-197 would maintain its own local avatar database 17 as shown in FIG. 1, but allow that database 17 to be accessed by other systems 181, 189-197 to retrieve avatar images and simultaneously keep database 205 updated with its identical local avatar assignments. Similarly, each local database 185, 190-200 shown in FIG. 7 would hold this index file for all servers (181, 189-197) in identical fashion. Hence, rather than having a single index file recording all avatars in all interoperated sites in a single location 204, that single index file would be replicated within each local avatar database for all servers (181, 189-197). By distributing a replicated index file rather than distributing full replicated avatar images along with the index files, transmission burdens may be reduced as well as local storage space requirements. Such a hybrid topology implemented in those shown in FIGS. 6 and 7 results in a federation of systems granting read and write accessibility and potentially gaining resource efficiencies, but only at the expense of constant high-speed communications of relatively large amounts of data.

While I have shown my invention in one form, it will obvious to those skilled in the art that it is not so limited but is susceptible of various changes and modifications without departing from the spirit thereof. For example, the herein described systems and methods may be used with may types of institutions besides universities, such as, for example, healthcare providers like a hospital, or lower level educational institutions like elementary and high schools, or consumer retailers, or governmental offices.

The invention claimed is:

1. A system for tethering a plurality of avatars, comprising:
   a. an avatar image database including a first avatar association to a first user accessing said internet forum website held in said database, wherein said first avatar association connects said first user to an avatar image portraying a selected aspect of said first user; and a second avatar association to said first user in said database, wherein said second avatar association connects said first user to an avatar image portraying an image associated with a third party representative of a quality or characteristic of said first user;
   b. a webserver for generating web pages for said internet forum website, wherein said webserver further includes means for displaying communicative messages in chronological posting order, and wherein each said message posting includes a user perceivable boundary surrounding each said posting;
   c. said webserver including means for generating a webpage on said internet forum website responsive to a remote user's request, wherein said webpage generating means is adapted to deliver a webpage displaying at least two avatars graphically bound to a single posting by said first user on said internet forum, and wherein said generating means delivers said avatars responsive to said first and second avatar associations; and,
   d. wherein said tethering system includes means for reconciling changes in said avatar image database by storing, exchanging, and updating at least one file for holding a table for indexing said avatar images.

2. An avatar tethering system as recited in claim 1, further comprising a third avatar association to said first user, wherein said third avatar association connects said first user to an avatar image representing a website sponsor of the website onto which said first user is logged on, and wherein said generator means further delivers said third avatar responsive to said third association.

3. An avatar tethering system as recited in claim 2, further comprising:
   a. a first avatar association to a second user accessing said internet forum site held in a database, wherein said first avatar association for said second user connects said second user to an avatar image portraying a selected aspect of said second user,
   b. a second avatar association to said second user, wherein said second avatar association to said second user connects said second user to an avatar image portraying an image associated with a third party; and,
   c. wherein said first and second avatar associations of said second user are associated to said first and second avatar associations of said first user such that said website generating means generates a webpage displaying said avatars associated with said first user and said avatars associated with said second user adjacent to each other when either of said users are responding to a communicative action of the other user.

4. An avatar tethering system as recited in claim 1, wherein said webpage generating means further comprises means for sizing and arranging each said avatar such that the distance between each avatar is at least as close as the maximum width of any avatar and wherein at least one avatar is positioned within said maximum width of said posting boundary.

5. An avatar tethering system as recited in claim 4, wherein said third party in said second avatar association comprises an advertising sponsor selected from a pool of advertising sponsors on a rotating basis.

6. An avatar tethering system as recited in claim 5, wherein said second avatar association connects said first user to a trademark of said third party.

7. An avatar tethering system as recited in claim 3, wherein said webpage generating means delivers a webpage displaying a plurality of communicative actions from a plurality of users, and wherein said generating means further delivers said webpage displaying multiple avatars adjacent to each communicative action responsive to a plurality of avatar associations connected to each user.

8. An avatar tethering system as recited in claim 7, wherein as least one of said avatar associations comprises an avatar representative of the amount of time said first user has been registered on said website.

9. An avatar tethering system as recited in claim 8, wherein said third party in said second avatar association comprises a college sports brand.

10. An avatar tethering system as recited in claim 1, further comprising a plurality of tethering systems, wherein each said tethering system is connected to and obtains each of said avatar associations from a single remote database.

11. A system as recited in claim 1, further comprising a plurality of tethering systems, wherein each said tethering system is connected to each other, and wherein each said avatar image database in each said tethering system is reconciled through communication with a reconciling database for reconciling changes between each said avatar image database such that each image database comprises a substantial facsimile to each other image database.

12. An avatar tethering system as recited in claim 9, wherein said second avatar association connects said first user to a trademark of said third party.

13. A system for tethering a plurality of avatars to a user, comprising:
   a. an avatar image database including first means for associating a first user accessing said internet forum website held in said database with an avatar image holding a resemblance to a physical representation of said first user; and
   second means for associating said first user in said database to an avatar image portraying an image associated with an advertising sponsor advertising on said internet forum website, wherein said second association means is representative of a quality or characteristic of said first user;
   c. third means for associating said first user to an avatar image portraying an image associated with a primary sponsor to said website;
   d. a webserver for generating web pages for said internet forum website, wherein said webserver further include means for displaying communicative messages in chronological posting order, and wherein each said message posting includes a user perceivable boundary surrounding each said posting, said plurality of boundaries creating a row-like organization;

e. said webserver including means for generating a webpage on said internet forum website responsive to a remote user's request, wherein said webpage generating means delivers a webpage having three avatars adjacent to each said message posting of said first user on said internet forum website, and wherein said generating means delivers said avatars responsive to said first, second, and third avatar association means; and, f. wherein said tethering system includes means for reconciling changes in said avatar image database by storing, exchanging, and updating at least one file for holding a table for indexing said avatar images.

14. An avatar tethering system as recited in claim 13, wherein said webpage generating means further comprises means for generating a user perceivable boundary surrounding each said avatar and wherein said avatars are positioned such that at least one other avatar image boundary touches the boundary of another avatar, and such that at least one avatar boundary touches said message posting boundary for each said message posting.

15. An avatar tethering system as recited in claim 14, wherein said webpage generating means delivers a webpage displaying a plurality of communicative actions from a plurality of users, and wherein said webpage displays at least three avatars adjacent to each communicative action responsive to a plurality of avatar associations connected to each user.

16. . An avatar tethering system as recited in claim 15, wherein at least one of said avatars comprises a college sports brand.

17. A method for tethering a plurality of avatars to a user on an internet forum website, comprising the steps of:
a. associating a first avatar to said user accessing said internet forum website and saving said association in an avatar image database, wherein said first avatar represents an image portraying a selected aspect of said first user; and
associating a second avatar to said first user and saving said second association in said avatar image database, wherein said second avatar represents a quality or characteristic of said first user;
b. initiating a process for the creation of a website to be served to a remote requesting personal computing device;
c. retrieving at least two avatars responsive to said first and second avatar association steps;
d. transmitting an internet forum webpage to said remote requesting personal computing device wherein said webpage displays said at least two avatars each contained in a user perceivable boundary and positioned next to each other within the maximum graphical size diameter of any displayed avatar , wherein each message posting has its own user perceivable boundary and at least one of said avatars is positioned in close proximity to said posting boundary such that the maximum distance between said at least one avatar and said posting boundary is less than the maximum diameter of said at least one avatar on said webpage; and
e wherein said method for tethering a plurality of avatars to a user includes the step of reconciling changes in said avatar image database by storing, exchanging, and updating at least one file for holding a table for indexing said avatar images.

18. An avatar tethering method as recited in claim 17, further comprising the step of associating a third avatar to said user accessing said internet forum website and saving said third association in a database, wherein said third avatar represents a website sponsor onto which said first user is logged on, and wherein said generator means further displays said webpage with a graphical mastiff frame displaying graphic information associated with said website sponsor, and said webpage includes a graphical theme utilizing a graphical style and graphical objects similar to said mastiff frame.

19. An avatar tethering method as recited in claim 18, further comprising the steps of:
a. associating a first avatar to a second user accessing said internet forum website and saving said association in a database, wherein said first avatar association for said second user connects said second user to an avatar image portraying a selected aspect of said second user,
b. associating a second avatar to said second user and saving said association in a database, wherein said second avatar association for said second user connects said second user to an avatar image portraying an image associated with an advertising sponsor; and,
c. wherein said step of initiating a process for the creation of a webpage causes the transmittal of a webpage to said requesting personal computing device having displaying said avatars associated with said first and second users adjacent to each other when either of said users are responding to a communicative action of the other user.

20. An avatar tethering method as recited in claim 17, wherein said step of initiating a process for the creation of a webpage further comprises the step of arranging said avatars and said message posting in a table format having a single row and a plurality of cells for holding each said avatar image in a separate cell.

21. An avatar tethering method as recited in claim 17, wherein said step of initiating a process for the creation of a webpage further comprises the step of creating a hyperlinked graphical frame surrounding each avatar image and said message posting, and wherein the boundary of each said frame in said row touches at least one other boundary of a frame in said row.

22. An avatar tethering method as recited in claim 21, wherein said step of associating a second avatar to said first user further comprises associating said first user to an advertising sponsor selected from a pool of collegiate sponsors.

23. A social networking website server, comprising means for delivering a hyper media social networking webpage having a plurality of message postings, each posting having a user perceived boundary, and at least three avatars displayed adjacent to each said message posting, wherein said delivering means includes an avatar image database holding said at least three avatars and means for reconciling changes in said avatar image database by storing, exchanging, and updating at least one file for holding a table for indexing said avatar images, wherein said delivering means includes means for displaying said at least three avatars in equally sized tiles touching one another with one avatar tile touching said associated message posting wherein one of said avatars portrays a user, another of said avatars displays an indicia associated with a third party representative of a quality or characteristic of said first user; and said third avatar displays an indicia associated with a third party advertising on said social networking site.

24. A social networking website webpage server as recited in claim 23 further comprising means for new users visiting said website that are part of a collective including said social networking webpage server to be recognized by said server, and wherein said webpage server further includes means for accessing and retrieving avatars associated with said visiting user.

25. A social networking website webpage server as recited in claim 24, further comprising a plurality of webpage servers, each said webpage server connected to each other through the Internet, and wherein each said webpage server is connected to a single central avatar database from which each said webpage server saves and retrieves their respective avatar images.

26. A social networking website webpage server as recited in claim 23, wherein at least one of said avatars comprises an animated image.

27. A social networking website webpage server as recited in claim 23, wherein at least one of said avatars comprises a streamed video image.

28. An avatar tethering system as recited in claim 7, wherein at least one of said avatars comprises an animated image.

29. An avatar tethering system as recited in claim 7, wherein at least one of said avatars comprises a streamed video image.

* * * * *